July 4, 1950 — G. P. BOSOMWORTH — 2,514,187
PROCESS OF PRODUCING UNIFORM LOW STRETCH CORDS
Filed Dec. 29, 1945
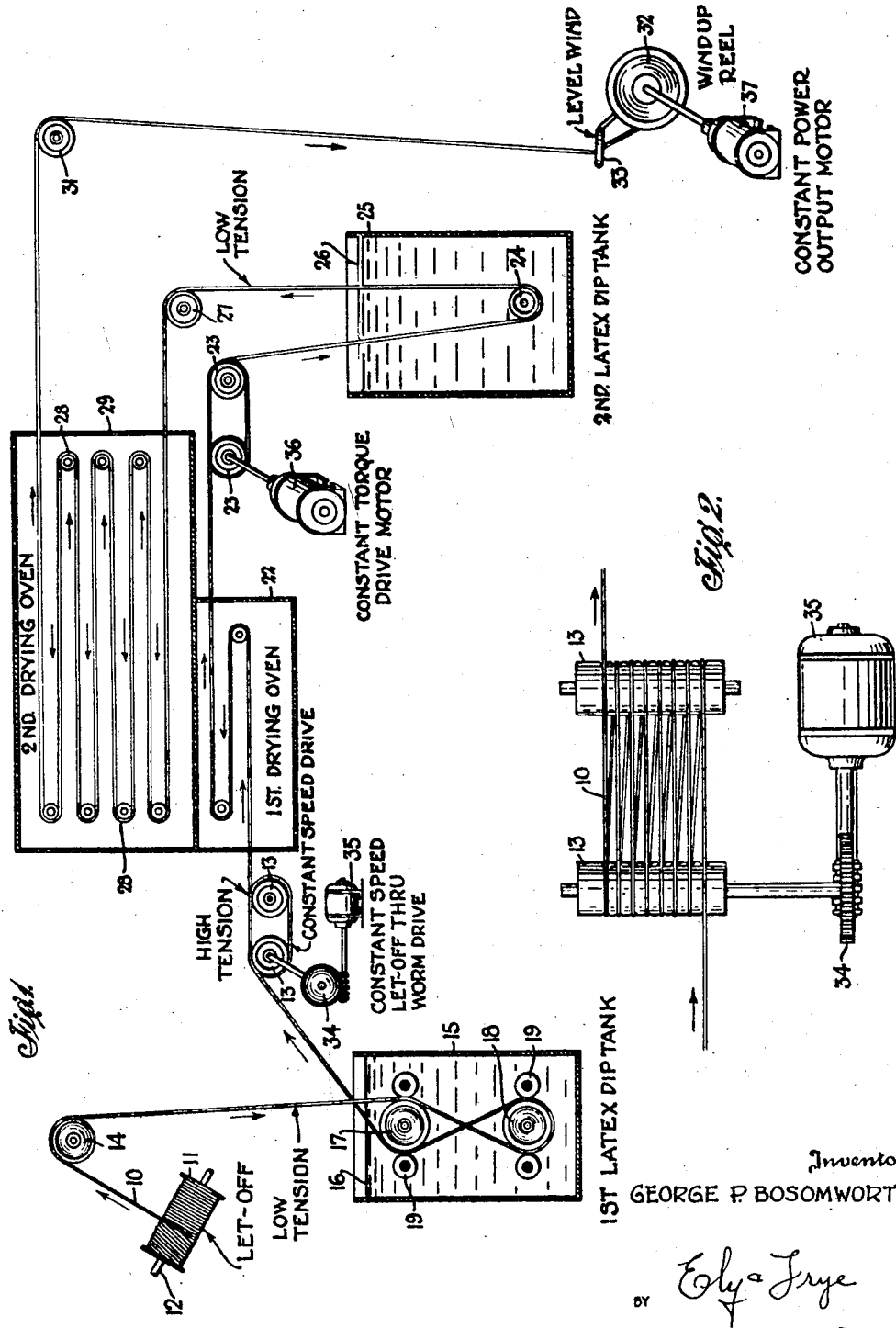
Inventor
GEORGE P. BOSOMWORTH
by Ely & Frye
Attorneys Patented July 4, 1950

2,514,187

UNITED STATES PATENT OFFICE 2,514,187

PROCESS OF PRODUCING UNIFORM LOW STRETCH CORDS

George P. Bosomworth, Akron, Ohio, assignor to The Firestone Tire & Rubber Company, Akron, Ohio, a corporation of Ohio Application December 29, 1945, Serial No. 638,249

2 Claims. (Cl. 117—7)

This invention relates to the art of processing cord, and especially relates to a method for producing improved rubber-reinforcing cord.

One process of the type relating to the present invention is that wherein cord which is to be used as reinforcing in a fan belt is immersed in a latex bath and then dried, the cord initially being drawn from one spool and ultimately being wound up upon a second spool. Ordinarily this process involves the use of a constant speed wind-up mechanism and tension is obtained on the cord by the use of a brake on the let-off means that controls unrolling the cord from the spool on which it is initially wound. In this process, the factors of speed and tension of the cords are so interlocked that it is difficult to obtain either to any predetermined figure, with any degree of accuracy. Furthermore, the tension on the cord at the wind-up means is equal to the drag on the cord at the let-off means, plus whatever intermediate friction may develop between the two points. This means that the cord is subjected to a rather unknown or uncontrollable maximum tension, with the tension, of course, on the cord varying at various places in the cord processing apparatus.

It is an object of the present invention to provide an improved method for processing cord uniformly to produce high tensile strength rubber-reinforcing cord of uniform properties.

Another object is to provide a method for producing improved rubber-reinforcing cord of high tensile strength, controlled elongation and improved flexibility and "feel."

The foregoing and other objects will be manifest as the specification proceeds.

This application is a continuation-in-part of application Serial No. 534,127, filed May 4, 1944, now Patent 2,381,398.

In the accompanying drawing:

Figure 1 is a diagrammatic elevation of one embodiment of suitable apparatus for practicing the invention; and Figure 2 is a diagrammatic plan view of cord driving means of the apparatus of Figure 1.

Referring in detail to the accompanying drawing, there is shown a continuous length of cord 10, which originally is wound upon a spool 11, that is journaled on a shaft 12 and that usually has a drag or brake (not shown) associated therewith to keep the cord taut as it is drawn from the spool. The cord 10 is drawn from the spool 11 by means of cylindrical rolls 13, 13 which are driven at constant speed and which have the cord wound therearound in several convolutions so as to obtain a "purchase," or grip on the cord. The rolls 13 have a plurality of annular corrugations in their faces, as shown, but may comprise a plurality of narrow pulleys which are abutted on and turn with a common shaft. One of the rolls 13 may be driven through a non-reversible worm gear 34 by any suitable means, such as induction motor 35, to rotate the roll at a constant speed. Usually the second roll 13 is not positively driven except by the cord passing therearound.

In being drawn from the spool 11, the cord may pass over a guide pulley 14, and next pass to an aqueous bath, water, or a water solution, suspension, or dispersion, in this instance latex 16, contained in a tank 15. The latex is of any suitable composition and properties and may be either naturally or artificially created. The cord 10 is led around vertically aligned rolls 17 and 18 while in the tank 15. Auxiliary rolls 19 under spring pressure hold the cord against the rolls 17 and 18, as it passes therearound and cause a certain amount of deformation to facilitate impregnation. Wet cord from the tank 15 then passes around the rolls 13 which are adapted to advance the cord convolutions along the rolls whereby the cord is led into the rolls at one end thereof and drawn off at the other end of same, as shown in Figure 2.

After the cord passes around the constant speed rolls 13, 13, it is then drawn through a drying oven 22, and the cord is subjected to a uniform constant tensional pull set up thereon through rolls 23, 23, which are similar to the rolls 13 and also obtain a "purchase" or grip on the cord 10. However, the rolls 23 differ from the rolls 13 in one material regard in that one of the rolls 23 usually is driven by a direct current, constant torque motor 36 which is of the permanent magnet type and has a wound rotor. Since the radius of the rolls 23 is constant, the constant torque motor sets up a constant tension on the cord so that, in all events, the cord, as it passes from the set of rolls 13, 13 to the rolls 23, 23, has a constant tension exerted thereon, which tension is uniform throughout any length of material processed. A feature of the apparatus is that this tension is controlled solely by the peripheral speed of the rolls 23 with relation to the peripheral speed of the rolls 13. The motor driving the rolls 23 should have a constant torque over a fairly wide speed range in order to maintain constant tension on the cord 10.

Any suitable means may be used to heat the drying oven 22. Thus a current of hot air may be passed therethrough, or heating means may be contained in the drying oven to heat same.

After the cord passes around the set of rolls 23, 23, the cord may again be immersed in an aqueous bath, which bath would be the same, ordinarily, as that contained in the tank 15; hence the cord 10 passes, for example, around a pulley 24 which is immersed in a tank 25 that contains latex 26. As the cord is drawn out of the bath 26, it is led around a guide pulley 27 and into a drying oven 29, the cord being wound around a series of pulleys 28 suitably journaled in the drying oven 29. Ordinarily the pulleys 28 should be vertically spaced and be positioned at the end of the oven, as shown. The oven 29 may be associated with or be part of the oven 22, and may be heated in any desired manner, or may be unheated.

The dry cord from the oven 29 is led around a roller 31 and then to a wind-up reel 32, which has level winding means 33 associated therewith to distribute cord evenly over the reel 32. A further feature of the process is that the reel 32 is driven by a motor 37 which has a constant horsepower output over about at least a 3 to 1 speed range and which exerts a constant tensional force upon the cord 10 between the rollers 23, 23 and the wind-up reel 32 and winds up the cord 10 at a speed equal to the let-off lineal speed of the cord from the spool 11 plus the increase in length of the cord due to its stretch under tension. The motor driving the reel 32 produces this tension upon the cord regardless of the amount of cord wrapped upon the reel, so that the radius of pull, or torque set up by the reel 32 may vary but the actual tensional force on the cord remains constant for a large increase over the original radius of the reel 32; for example, an increase in diameter of the reel from 3 to 12 inches due to the cord wound thereon. The wind-up rate is substantially constant but varies slightly to compensate for slight variations in the degree of stretch of the cord under the constant tension exerted thereon.

In the apparatus disclosed it is desirable that the rolls 13 be driven at a constant speed and the rolls 23, 23 have a constant torque drive applied thereto. Preferably, the reel 32 has a means of driving same so that the pull set up on the cord and the wind-up rate of same is substantially constant. One electrical motor that has proved suitable for use as a driving means 37 for the reel 32 is a series type direct current motor with a large external resistance and with the field for the motor being in series with the armature. Then by using a three phase alternating current driving motor 35 to drive the rolls 13, which motor operates at the desired speed, the cord 10 will be drawn off the spool 11 at the desired rate, and the speed of the motor approaches but does not exceed the synchronous speed thereof. The non-reversible worm gear 34 connecting the motor to the roll will not overrun the motor so as to change the speed at which the cord is drawn off the spool 11.

It is generally desirable to apply the maximum tension to the cord during the heating step immediately following the initial dipping operation, that is, between rolls 13, 13 and rolls 23, 23. A tension of from 50% to 90% or just short of the bone dry breaking strength of the untreated cord produces maximum increases in tensile strength during this initial stretching treatment. A tension in the order of 60 pounds (substantially 70% of the bone dry breaking strength of the untreated cord) has been found satisfactory in this stage when the cord being processed was a conventional cotton or rayon fan belt reinforcing cord having a bone dry breaking strength of about 85 pounds.

After leaving the rolls 23, 23, the cord is ordinarily under a diminished tension imparted thereto solely by the windup means 32. Thus, the higher tension existing in the cord between rolls 13 and 23 is localized therebetween, and is not transmitted to the cord traveling from rolls 23. This second stretching tension is preferably in the range of 5 to 50% of the bone dry breaking strength of the untreated cord. In the case of a conventional fan belt cord, as above, a tension in the order of 35 pounds (substantially 40% of the bone dry breaking strength of the untreated cord) has been found suitable to apply by means of the driven wind-up means 32.

Now it will be seen that the tensional force exerted on the cord in the first step of processing same is a known, controllable tension which can be uniformly exerted on various lengths of cord. Furthermore, the rate of wind-up of processed cord upon the wind-up reels does not determine the tension of the cord when wound up, nor does it control the tensional force set up on the cord during the first stages of processing same. It will be seen that this principle applies to cord, or fabric treating processes regardless of the specific steps of same, as long as the cord is to be tensioned and wound up or used at a rate which is to be independent of the tensioning treatment of the cord but which sets up a substantially uniform tension and a uniform residual stretch in the cord.

From the foregoing it will be seen that an uncomplicated, easily operated apparatus is provided for processing various lengths of cord or fabric or the like uniformly. At the same time, the apparatus serves to divide, or separate the stretching of the cord from the wind-up rate of the cord, thereby providing two separate, controllable operations which are exerted upon the cord.

The finished cord produced by the present invention has been found to be unusually uniform and of high quality. The cord may be produced to exhibit a very high tensile strength, which does not vary appreciably between various lengths or among different lots of the processed cord. The cord also possesses more uniform cross-sectional dimensions than conventional processed cord, and imparts a longer useful life to a rubber article, such as a fan belt, pneumatic tire or other reinforced rubber article incorporating the cord. By controlling the tension of the second stretching treatment, as between rolls 23 and the wind-up means, the elongation of the finished cord can be controlled; the lower this second stretching tension, the higher is the elongation of the finished cord, and the softer is the "feel" thereof. The present cord process may be applied to a textile cord capable of being swollen by water, such as a cotton, rayon, nylon, or the like, rubber-reinforcing cord to produce improved cord in each case.

While one species of the process of the invention has been completely illustrated and described herein, it will be appreciated that modification may be made without departing from the scope of the invention, as defined in the appended claims.

What is claimed is:

1. A method of producing a uniform, low stretch cord suitable for reinforcing a rubber article, which consists in impregnating with an aqueous bath a textile cord capable of being swollen by water, applying to the wet cord a uniform predetermined high tension equal to 50 to 90% of the bone dry breaking strength of the untreated cord and drying the cord while maintaining it under said high tension, reducing the tension on the dry cord to a uniform predetermined low tension equal to 5 to 50% of the bone dry breaking strength of the untreated cord and impregnating the cord a second time with an aqueous bath while maintaining the cord under said low tension, and then drying the wet cord while maintaining it under said low tension.

2. A method of producing a uniform, low stretch cord suitable for reinforcing a rubber article, which consists in impregnating a cotton textile cord with latex, applying to the wet cord a uniform predetermined high tension equal to substantially 70% of the bone dry breaking strength of the untreated cord and drying the cord while maintaining it under said high tension, reducing the tension on the dry cord to a uniform predetermined low tension equal to substantially 40% of the bone dry breaking strength of the untreated cord and impregnating the cord a second time with latex while maintaining the cord under said low tension, and then drying the wet cord while maintaining it under said low tension.

GEORGE P. BOSOMWORTH.

REFERENCES CITED

The following references are of record in the file of this patent:

UNITED STATES PATENTS

| Number | Name | Date |
| --- | --- | --- |
| 1,803,129 | Palmer | Apr. 28, 1931 |
| 1,911,878 | Bleibler | May 30, 1933 |
| 2,220,958 | Jennings | Nov. 12, 1940 |
| 2,364,467 | Nickerson | Dec. 5, 1944 |
| 2,381,398 | Bosomworth | Aug. 7, 1945 |
| 2,444,064 | Philipp | June 29, 1948 |